(12) United States Patent
Hamon

(10) Patent No.: US 11,039,223 B2
(45) Date of Patent: Jun. 15, 2021

(54) METHOD AND DEVICE FOR PROCESSING A MULTIMEDIA STREAM TO VERIFY ACCESS RIGHTS

(71) Applicant: VIACCESS, Paris la Defense (FR)

(72) Inventor: Vincent Hamon, Rennes (FR)

(73) Assignee: VIACCESS, Paris la Defense (FR)

( * ) Notice: Subject to any disclaimer, the term of this patent is extended or adjusted under 35 U.S.C. 154(b) by 290 days.

(21) Appl. No.: 16/066,192

(22) PCT Filed: Dec. 30, 2016

(86) PCT No.: PCT/EP2016/082940
§ 371 (c)(1),
(2) Date: Jun. 26, 2018

(87) PCT Pub. No.: WO2017/114958
PCT Pub. Date: Jul. 6, 2017

(65) Prior Publication Data
US 2020/0275169 A1      Aug. 27, 2020

(30) Foreign Application Priority Data
Dec. 30, 2015   (FR) ........................................ 1563460

(51) Int. Cl.
*H04N 21/8358*   (2011.01)
*H04N 21/4627*   (2011.01)
*H04N 21/81*   (2011.01)

(52) U.S. Cl.
CPC ..... *H04N 21/8358* (2013.01); *H04N 21/4627* (2013.01); *H04N 21/8173* (2013.01)

(58) Field of Classification Search
None
See application file for complete search history.

(56) References Cited

U.S. PATENT DOCUMENTS 6,452,609 B1 * 9/2002 Katinsky ................. H04L 67/02
715/716
7,941,553 B2 * 5/2011 Baumeister ....... H04L 29/06027
709/231

(Continued)

OTHER PUBLICATIONS

Anonymous, "Plug-in Basics—Plugins | MDN," Sep. 4, 2015. http://web.archive.org/web/20150904022234/https://developer.mozilla.org/en-US/docs/Plugins/Guide/Plug-in_Basics.

(Continued)

*Primary Examiner* — Fernando Alcon
(74) *Attorney, Agent, or Firm* — Soquel Group LLC

(57) ABSTRACT

The invention relates to a method for processing multimedia streams, in particular to verify access rights to a content of said multimedia stream, the multimedia stream being provided by a server device connected to a communication network, and downloadable by a client device via data formatted in a markup language, by using software for browsing and displaying data formatted in a markup language, cooperating with software for reading multimedia streams, the multimedia stream comprising at least one video stream able to be displayed in the form of pixels in a display zone (42, 44, 46, 48) of a display screen of the client device. The method includes determining a display zone (42), allocated by said browsing and display software to the software for reading multimedia streams in order to display a video stream extracted from said multimedia stream, and recording at least one digital image formed by values of the pixels to be displayed in the display zone (42) determined at a given time.

10 Claims, 4 Drawing Sheets

(56) References Cited

U.S. PATENT DOCUMENTS

| | | | | |
|---|---|---|---|---|
| 2003/0237100 | A1* | 12/2003 | Piotrowski | H04N 5/44543 |
| | | | | 725/135 |
| 2004/0263686 | A1* | 12/2004 | Kim | H04N 21/4858 |
| | | | | 348/556 |
| 2009/0259926 | A1* | 10/2009 | Deliyannis | G06F 16/70 |
| | | | | 715/205 |
| 2011/0150433 | A1 | 6/2011 | Alexandrov et al. | |
| 2013/0047178 | A1* | 2/2013 | Moon | H04N 21/482 |
| | | | | 725/25 |
| 2014/0379823 | A1 | 12/2014 | Wilsher et al. | |

OTHER PUBLICATIONS

Anonymous, "Adobe Flash—Mozilla | MDN," Sep. 15, 2014. http://web.archive.org/web/20140915141208/https://developer.mozilla.org/en-US/Add-ons/Plugins/Scripting_Plugins_Adobe_Flash.
French Patent Application No. 15 63460, INPI Rapport de Recherche Preliminaire, dated Jul. 19, 2016, 2 pages.
PCT Application No. PCT/EP2016/082940, International Search Report, dated Mar. 1, 2017, 3 pages.

* cited by examiner

METHOD AND DEVICE FOR PROCESSING A MULTIMEDIA STREAM TO VERIFY ACCESS RIGHTS

FIELD OF THE INVENTION

The present invention relates to a method for processing a multimedia stream, in particular to verify access rights to a content of said multimedia stream, and an associated device for processing a multimedia stream.

It falls within the field of processing multimedia streams, in particular to combat the illegal broadcasting of multimedia content subject to access rights.

BACKGROUND OF THE INVENTION

The recent development of devices having wireless communication capabilities and the ability to transfer large quantities of data using associated communication networks have made it possible to generalize access to multimedia content.

Thus, very large quantities of multimedia content are made available by servers, in the form of multimedia streams downloadable by a client device, through pages formatted in markup language. In order to obtain and display such pages, the client device uses a data browser for data formatted in a markup language, commonly called a "web browser". The downloaded multimedia streams can transport content of the film, series or documentary, prerecorded type, or first-run content, for example sporting or artistic events. In all cases, this content is protected, i.e., its use is subject to the possession of access rights, the acquisition of which in particular makes it possible to ensure that the right holders are paid.

Such multimedia streams can be made accessible by unauthorized broadcasters, in which case their access is not subject to the royalties due to the right holders. In this case, reference is made to illegal broadcasting and pirated multimedia content.

The quantity of multimedia streams distributed via the Internet makes it impossible to consider any manual analysis, using human operators, to effectively detect the illegal broadcasting.

There is therefore a need to automate the processing of multimedia streams in order to detect the illegal broadcasting of content.

Techniques exist for tattooing or marking digital data, in particular tattooing image data or video data streams, making it possible to insert information into these streams relative to the access rights for these streams, this information also being imperceptible to the human eye, but able to be decoded by appropriate processing software. Such techniques are usable to analyze multimedia streams and detect pirated multimedia streams as long as they are able to recover and record the multimedia streams in question.

Yet recovering and recording multimedia streams made available by illegal servers is problematic in several respects. Additionally, even providers of legal content may, without their knowledge, broadcast pirated content for which the access rights are not being respected.

On the one hand, in practice, in many cases, the web addresses or URLs (Uniform Resource Locator) indicating the source of the downloaded multimedia streams are concealed, or hidden, i.e., made difficult to extract from the system, so as to make any direct access difficult.

On the other hand, proprietary video stream reading software is sometimes necessary, and the video streams may be provided in encoded formats requiring specific decoding to be done by such software.

Lastly, it is common to broadcast, in the same multimedia stream to be displayed by a browser, several video streams in addition to the main video stream encapsulating the content subject to access rights, in particular additional video streams containing advertisements, or logos or other content, displayed superimposed on the main video stream. In this case, it is necessary to extract the main video stream from the transmitted multimedia stream(s).

Suitable methods exist for analyzing graphic display interfaces and simulating the behavior of a user, so as to perform a series of actions making it possible to select the displayed main video stream, but such methods are complex, require prior learning and do not make it possible to distinguish between the main video stream and additional video streams.

The invention aims to resolve the drawbacks of the state of the art.

SUMMARY OF THE INVENTION

To that end, the invention proposes a method for processing multimedia streams, in particular for verifying access rights to a content of said multimedia stream, the multimedia stream being provided by a server device connected to a communication network, and downloadable by a client device via data formatted in a markup language, and using software for browsing and displaying data formatted in a markup language, cooperating with software for reading multimedia streams, the multimedia stream comprising at least one video stream able to be displayed in the form of pixels in a display zone of a display screen of the client device.

The method includes the following steps:
- determining a display zone, allocated by said browsing and display software to the software for reading multimedia streams in order to display a video stream extracted from said multimedia stream, and
- recording at least one digital image formed by values of the pixels to be displayed in the display zone determined at a given time.

Advantageously, the invention makes it possible to record one or several digital images corresponding to a video stream extracted from a multimedia stream downloaded in a browser, cooperating with software for reading multimedia streams, without requiring any prior knowledge of the software for reading multimedia streams used.

The method for processing multimedia streams according to the invention may have one or more of the features below:

The recording is done at a predetermined temporal frequency, making it to possible to record a plurality of digital images of said video stream.

The step for determining a display zone implements an analysis of commands exchanged between the browsing and display software and the software for reading multimedia streams, based on a programming interface provided by said browsing and display software.

The method comprises a step for intercepting a command to create or initialize an executable instance of said software for reading multimedia streams.

It further comprises a step for determining a display mode from among a first mode and a second mode by analyzing a command to allocate a display zone sent by the browsing and display software and the software for reading multimedia streams.

When the display mode is a first display mode, the method comprises intercepting a command to update a display zone, and the recording of the values of the pixels to be displayed in the determined display zone is done after said interception of a command to update the determined display zone.

The multimedia stream includes at least two video streams comprising a main video stream and at least one additional video stream, each video stream having an associated display zone, and in that the determining step includes a determination, for each video stream, of the associated display zone, and an identification of a main display zone, among the determined display zones, as being the display zone associated with the main display zone.

The identification of the main display zone comprises at least one step for computing a score associated with each determined display zone and a selection, as main display zone, of the display zone whose associated score is the highest score or the lowest score.

The calculation of a score associated with each display zone depends on at least one operation from among a group comprising: calculating a surface area occupied by each display zone, calculating a number of display zones at least partially superimposed on each display zone, calculating a ratio between at least a first and second dimension of each display zone.

The recorded pixel values form a digital image, and the method comprises a step for analyzing recorded digital images making it possible to determine the digital images belonging to the main video stream and the digital images belonging to an additional video stream.

According to another aspect, the invention proposes a device for processing multimedia streams, in particular for verifying access rights to a content of said multimedia stream, the processing device including a central processing unit, a data storage unit, the processing device including or being connected to a display screen, the multimedia stream being provided by a server device connected to a communication network, and downloadable by the processing device via data formatted in a markup language, and using software for browsing and displaying data formatted in a markup language, cooperating with software for reading multimedia streams, the multimedia stream comprising at least one video stream able to be displayed in the form of pixels in a display zone of said display screen.

This device includes a module suitable for:
 determining a display zone, allocated by said browsing and display software to the software for reading multimedia streams in order to display a video stream extracted from said multimedia stream,
 recording at least one digital image formed by values of the pixels to be displayed in the display zone determined at a given time.

According to another aspect, the invention proposes a computer program including instructions for carrying out the steps of a method for processing multimedia streams as briefly described above when the program is executed by a processor of a programmable device.

BRIEF DESCRIPTION OF THE DRAWINGS

Other features and advantages of the invention will emerge from the description thereof provided below, for information and non-limitingly, in reference to the appended figures, in which.

DETAILED DESCRIPTION OF EMBODIMENTS

Figure 1:
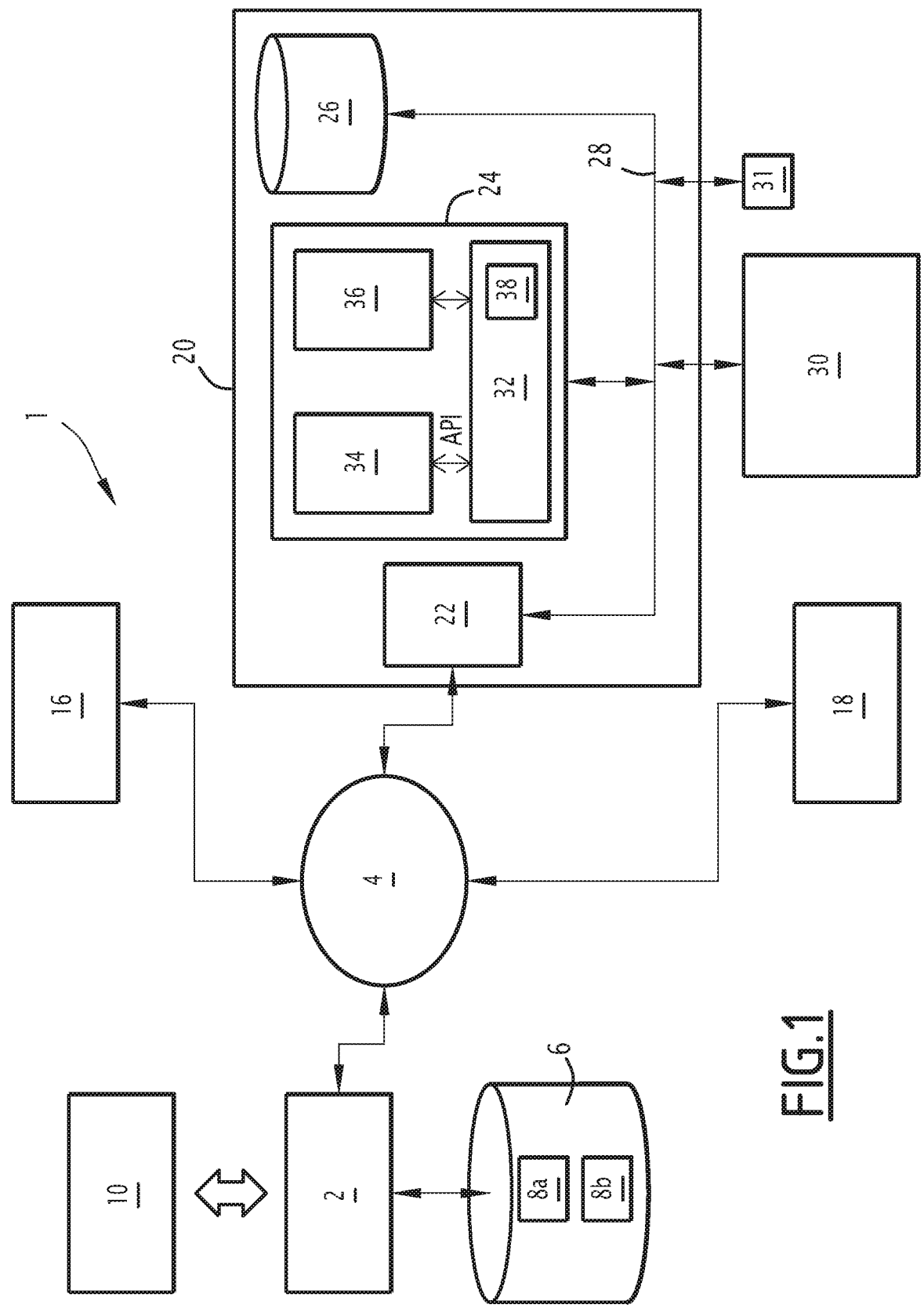
FIG. 1 schematically shows a system carrying out a method for processing multimedia streams according to one embodiment of the invention.

FIG. 1 schematically illustrates a system 1 carrying out client-server communications via a communication network, for example the Internet.

In this system 1, a server device 2 is schematically shown connected to a communication network 4, and also comprising a storage system 6, which can be distributed. The storage system 6 comprises multimedia content 8a, 8b, etc., which in this example is previously recorded.

For example, in the context of a "video on demand" (VOD) server, the multimedia content is for example video content comprising images and sound, for example movies, documentaries, television series, encoded in an appropriate encoding format.

Alternatively, the server 2 receives multimedia content in the form of multimedia streams from a content broadcaster 10, for example via a communication network other than the communication network 4, for example a satellite communication network. For example, these received multimedia streams correspond to a real-time broadcast of an artistic or sporting event, typically a show or sports match.

The system 1 also comprises client devices 16, 18, 20, these client devices also being connected to the communication network 4.

The client device 20 is outlined in FIG. 1, the other client devices having a similar structure.

In one embodiment, the client device 20 is a programmable device, for example a computer, comprising a communication unit 22 with the communication network 4, able to send and receive data using an appropriate communication protocol, for example the IP protocol (Internet Protocol).

The client device 20 also includes a central processing unit 24, including one or several processors, able to execute computer program instructions when the device 20 is powered on. The device 20 also includes an information storage unit 26, for example registers, able to store data and executable code instructions making it possible to carry out programs including code instructions able to carry out the method according to the invention. The various functional blocks of the device 20 described above are connected via a communication bus 28.

The programmable device 20 comprises or is connected to a display screen 30. Optionally, the programmable device 20 comprises an interface 31 for interacting with the user, for example keyboard, mouse or any other pointing means. In one embodiment, the display screen 30 is of the touch-sensitive type and also forms an interaction interface 31 with a user.

The central processing unit 24 includes software modules, in particular a software module 32, which implements a data communication protocol, for example the HyperText Transfer Protocol (HTTP), to obtain data and/or instructions provided by servers 2 implementing the same communication protocol, and provides a rendering on the screen 30 of viewable data extracted from the obtained data and/or instructions.

The viewable data comprise text, still images, videos.

The software module 32 is a network browsing and display module, commonly referred to as a web browser, or simply browser, the main function of which is to view information available on the World Wide Web.

The browser uses a web address or URL (Uniform Resource Locator), indicating the location of a page, commonly called webpage, set of resources containing data and/or instructions on a server implementing the HTTP protocol, and downloads the targeted page.

Such a webpage comprises data formatted in a markup language, for example HTML (Hypertext Markup Language), this language providing the text to be displayed as well as the general structure of the formatting: titles and paragraphs, lists, tables. The formatting can be refined by using cascading style sheets (CSS): margins, alignments, spacings, colors, borders, etc.

Traditionally, a browser is able to communicate with one or several software programs for reading multimedia streams (software module 34). Such software is also called "player". More generally, a browser is able to execute compatible extension software to provide additional functionalities.

The communication between the browser and any extension software is done by application programming interfaces (API), defining communication functions between the browser and any extension software, making it possible to perform functionalities, send information and send parameter values.

For example, the MozillaFirefox® browser uses an interface called NPAPI for Netscape Plugin Application Programming Interface.

In general, all browsers have an associated programming interface intended to allow outside software to interface with the browser and provide additional functionalities. In one alternative embodiment, the software for reading multimedia streams is integrated into the browser 32, for example in the case of HTML5 browsers. In this case, internal APIs are used, the operation being similar to that described above.

Furthermore, a software module 36 is added, comprising code instructions to carry out a method for processing multimedia streams according to the invention, embodiments of which will be described in detail below.

The browser 32 is able to display content intended to be viewed on a display screen 30.

To perform such a display, a browser 32 uses either an internal graphic composition engine 38 or an external graphic composition engine (not shown), which is a composition engine of the operating system implemented in the programmable device 20.

Each content is associated with an element to be displayed (still image or video stream), with which the graphic composition engine associates a reserved display zone on the display screen 30.

Each element is then displayed in the form of a set of pixels of the reserved display zone, each pixel being a display unit on a screen and having an associated value encoded over several bits. The values of the pixels to be displayed at a given time are digital image data forming an image to be displayed.

When the element to be displayed is a video stream, the values of the pixels of the display zone are refreshed at a temporal frequency determined by the encoding format of the video stream.

A display zone has a planar geometric shape, for example rectangular, and is characterized by parameters characterizing the planar geometric shape, its position on the display screen and its depth Z, making it possible to define a plane with an associated depth and to define a hierarchy of depth between the display zones.

For example, a rectangular display zone is defined by a position parameter, length L, width I along the axes X and Y of an associated spatial coordinate system and depth Z parameters. A spatial coordinate system (X, Y, Z) is illustrated in FIG. 2.

Figure 2:
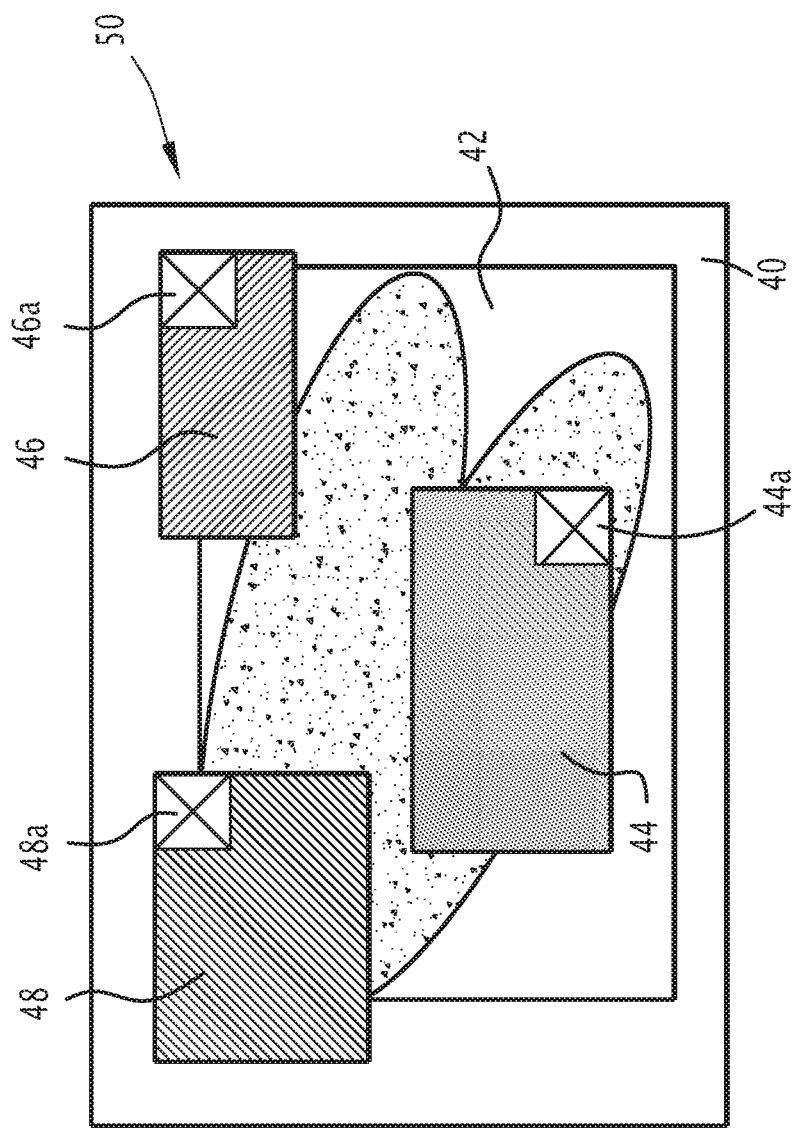
FIG. 2 shows an example display comprising a plurality of display zones intended to display video streams.

Thus, in the example of FIG. 2, a page to be displayed 50 comprises a screen background zone 40 having an associated depth $Z_0$, for example equal to 0.

A second zone 42, containing the element to be displayed that one wishes to view, which contains the main video stream, is displayed with an associated depth $Z_1 > Z_0$.

However, several additional display zones 44, 46, 48, with smaller sizes, are displayed above, for example comprising contents of the type: advertising video stream, logos or informational text.

In the illustrated example, the display zones 44, 46, 48 have associated depths $Z_2, Z_3, Z_4$, which may be equal, but all greater than $Z_1$.

Traditionally, a user wishing to view the main video stream displayed in the display zone 42 acts on interaction zones 44a, 46a, 48a associated with the display zones to close the display zones or windows 44, 46, 48.

Alternatively, a display duration is associated with each display zone 44, 46, 48 in the definition file of the page to be displayed.

The method for processing multimedia streams according to the invention aims to identify the main display zone corresponding to the main video stream to be displayed, and to successively record images of the main video stream from values of the display pixels in the identified display zone.

Thus, advantageously, the method according to the invention does not require knowledge of the operating mode of the software for reading video streams or the encoding format of the received video streams.

Figure 3:
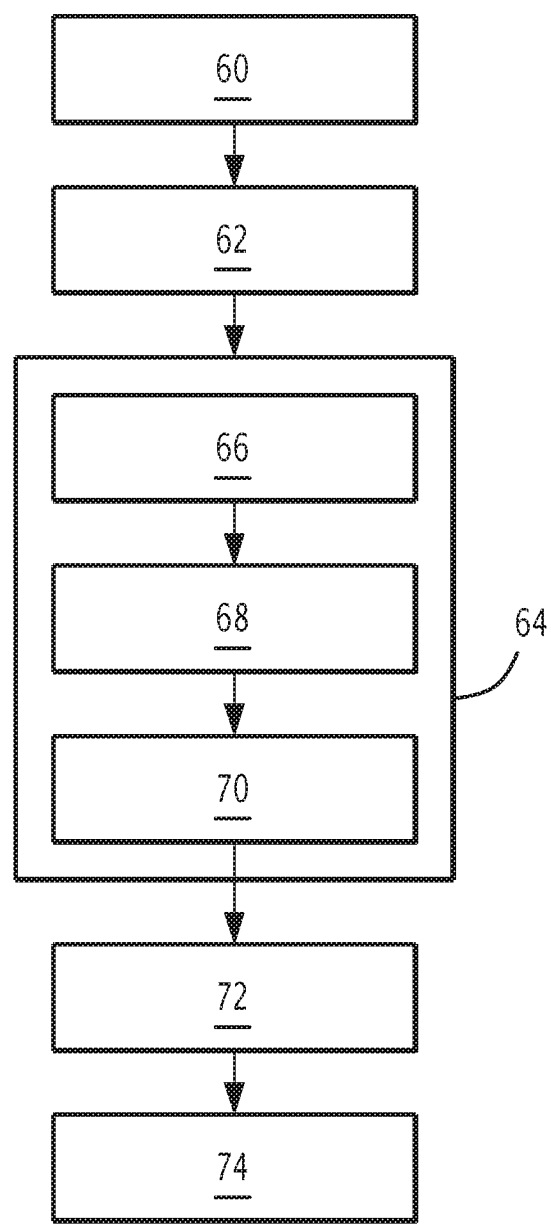
FIG. 3 is a block diagram of the main steps carried out by a method for processing multimedia streams according to one embodiment of the invention.

FIG. 3 is a block diagram of the main steps of a method for processing multimedia streams according to one embodiment of the invention, carried out by a processor of a programmable device 20.

The method comprises a first step 60 for obtaining data formatted according to a markup language, for example in the form of a webpage downloaded from a server, including display instructions executable by the browser to display one or several multimedia streams, in particular containing text, images and one or several video streams to be displayed. This step for obtaining data is carried out by the browser 32.

Step 60 is followed by a step 62 for triggering the execution by the browser 32 of the webpage obtained for performing the display.

This step 62 is followed by a step 64 for determining a display zone allocated for displaying a main video stream contained in the downloaded multimedia stream(s), implemented by the software module 36, and using the analysis of the commands exchanged between the browser and the software for reading multimedia streams.

It will be noted that here the case is considered of software for reading multimedia streams, but it is understood that the operation is similar if several different software programs for reading multimedia streams are implemented.

Step 64 comprises a sub-step 66 for intercepting, via the software module 36, a command to create or initialize an executable instance of software for reading multimedia streams, based on the application programming interface (API) provided by the browser.

For example, when the API is NPAPI, a NP_Initialize( ) command is executed to initialize an executable instance of the software for reading multimedia streams as an extension of the browser. Next, instances of this software for reading multimedia streams are initialized via NPP_New( ) commands.

More generally, the functions bearing the "NPP_" prefix indicate a command sent from the browser to the software for reading multimedia streams, and more generally to add-on software, while functions bearing the "NPN_" prefix indicate a command sent by add-on software to the browser.

After a command relative to the creation or initialization of an executable instance of the software for reading video streams is intercepted, a sub-step 68 for determining parameters for identifying each display zone allocated to display a video stream, in which the software for reading multimedia streams will provide video content to be displayed in the form of pixel values to be displayed.

Various embodiments of the determination 68 of the parameters for identifying each allocated display zone are considered, as explained in detail below, depending on the display mode used.

If applicable, if several display zones are identified to display various video streams, like in the example illustrated in FIG. 2, step 68 is followed by a step 70 for determining the main display zone associated with the main video stream to be displayed, which contains the content of interest that may be broadcast illegally, the other video streams being additional video streams, for example of the advertising type.

Step 64 for determining a display zone allocated for displaying the main video stream is followed by a step 72 for recording values of the pixels displayed in the main display zone, associated with the main video stream.

According to a first embodiment, the recording is done at a recording temporal frequency that may be predetermined.

Alternatively, the recording is done as a function of commands to update the main display zone, intercepted by a prior step for intercepting commands.

Thus, a series of image data is recorded, and subsequently processed during a processing step 74. The processing for example consists of analyzing the recorded image data to extract marking information therefrom, using indelible and imperceptible marking or watermarking methods, this marking information making it possible to obtain information relative to the right to access the contents of the corresponding video stream.

Alternatively, the processing 74 consists of encoding using a selected video encoding format.

According to one alternative, the processing step 74 also implements processing operations to analyze the recorded image data making it possible to eliminate a portion, so as to keep only the image data belonging to the main video stream and not the image data for example belonging to transitional screens or advertising videos embedded in the received multimedia stream comprising the main video stream.

Methods known by those skilled in the art can be used to that end.

For example, successive images are compared and still images are detected and eliminated.

Furthermore, black or more generally uniform images are also eliminated, these images in all likelihood corresponding to transitional screens.

Lastly, a high scene change frequency indicates advertising content; successive images with a high scene change rate are therefore eliminated.

Conversely, a low detected change frequency is considered characteristic of a sporting event or broadcast channel; the images are therefore kept.

The implementation of step 68 for determining identification parameters of each display zone allocated for displaying a video stream depends on the implemented display mode.

When the NPAPI API is used, two display modes are distinguished: a first display mode, called "windowless", in which the software for reading multimedia streams displays the decoded video stream directly via the browser, and a second display mode, called "windowed", in which the browser allocates a display window to the software for reading multimedia streams for the display.

The "NPP-SetWindow( )" function is used to allocate a display zone, but the parameters used depend on the display mode.

Figure 4:
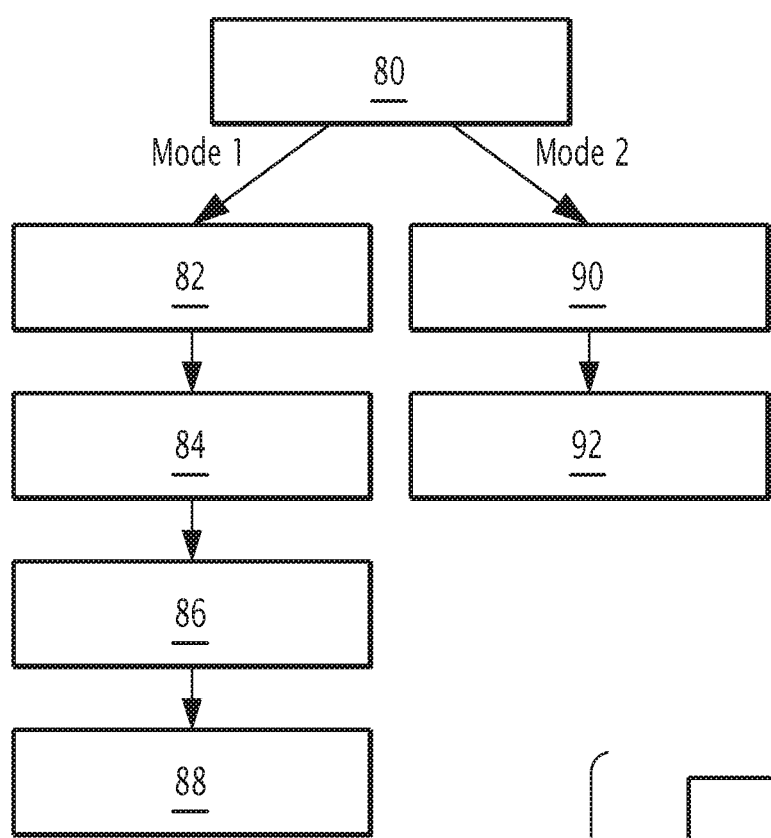
FIG. 4 is a block diagram of the main steps carried out to determine parameters for identifying each display zone allocated according to one embodiment of the invention.

FIG. 4 schematically illustrates the steps carried out to determine the allocated display zones, depending on the display mode, in an embodiment where the graphic display environment used is the X Window® environment.

During a first step 80, it is determined whether the display mode used is the first mode ("windowless" mode) or the second mode ("windowed" mode), by detecting the presence of a predetermined parameter in the HTML page.

If the display mode is the first display mode, a step 82 for intercepting the "NPP_SetWindow( )" command is carried out, this command using, as parameter, an object defining the display zone, called "drawable".

"NPN_InvalidateRect( )" or "NPN_InvalidateRegion( )" commands, sent by the software for reading multimedia streams to the browser, are intercepted in step 84, these commands indicating the need to update the "drawable" display zone.

Next, during step 86, a "NPP_HandleEvent( )" command is intercepted, this command comprising, in a parameter, an identification reference of the updated "drawable" display zone.

Step 86 is followed by a step 88 for obtaining the identification reference of the display zone.

Advantageously, when this first display mode is implemented, the interception of the "NPP_HandleEvent( )" command makes it possible at the same time to determine the update of the display zone.

If the display mode is the second display mode, step 90 intercepts the "NPP_SetWindow( )" command and is followed by step 92 for obtaining a window identifier value of the X Window system allocated to the display. This identifier value is sent to the software for reading video streams, which can then display it directly without informing the browser.

Nevertheless, the obtained window identifier value makes it possible to determine the allocated display zone.

It then suffices to record the values of the pixels displayed in this identified display zone, with a predetermined time frequency.

Alternatively, the window system is modified to intercept update notices, making it possible, like for the first display mode, to determine the update of the display zone and record values of the displayed pixels only following an update of the display.

As explained above, in most cases, several display zones are determined, in which case a step for determining the main display zone corresponding to the main video stream is carried out.

Figure 5:
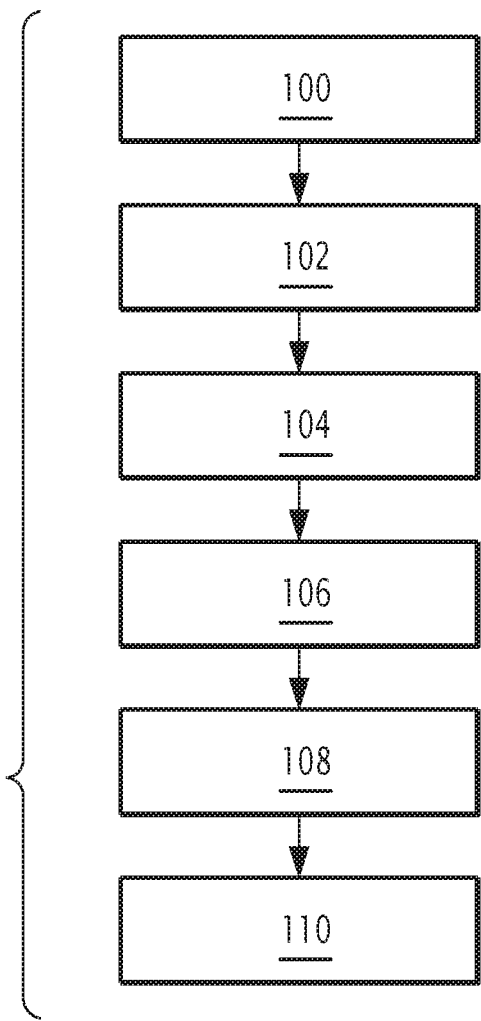
FIG. 5 is a block diagram of the main steps carried out to determine the display zone associated with the main video stream according to one embodiment of the invention.

FIG. 5 is a block diagram of the main steps carried out to determine the main display zone from among a plurality of display zones, according to one embodiment of the invention.

For this determination, at least one simple heuristic is carried out, making it possible to calculate a final score associated with each determined display zone, and to select, as main display zone, the zone obtaining the best final score.

In the embodiment of FIG. 5, a first step 100 is carried out for obtaining display position, size and depth parameters of the determined display zones $S_1$ to $S_N$.

Next, several heuristics are carried out making it possible to associate, with each of the N display zones, a score according to each of these heuristics.

During a step 102, the surface area of each of the zones $S_1$ to $S_N$ is determined, and decreasing scores are associated as a function of the occupied surface area, the maximum surface area zone having the best score according to this surface area heuristic.

Returning to the example of FIG. 2, in which the screen background 40 is eliminated because it is not displayed via software for reading multimedia streams, N=4 remaining display zones 42, 44, 46 and 48 are distinguished.

The zone 42 has the largest surface area, followed by zones 44, 48 and 46.

During a step 104, the length/width ratio is determined of the rectangle corresponding to each display zone, and it is compared to a predetermined value, for example 4/3 or 16/9, which are the ratios most used for the display of the main streams.

The display zones are then ranked as a function of the distance between the obtained ratio and the predetermined value. The zone with the ratio closest to the predetermined value receives the best score according to this format heuristic.

During a step 106, one determines, based on the depth value $Z_i$ associated with each display zone $S_i$, the number of zones superimposed on each of the display zones. Hypothetically, the display zones corresponding to advertising content are positioned above the main display zone.

In the case of FIG. 2, the zone 42 has 3 display zones superimposed or overlapping it at least partially, while the other three display zones are in the foreground. The display zone 42 therefore receives the best score according to this depth heuristic.

During a step 108, one determines the centering relative to the display screen of each of the zones, for example by the distance between the center of each display zone and the center of the total display surface area of the screen. For this centering heuristic as well, the display zone 42 obtains the best score, since it is centered.

Lastly, the scores for each display zone relative to the various heuristics are combined into one final score, and during step 110, the display zone obtaining the best final score is selected as the main display zone corresponding to the display of the main video stream.

In one embodiment, the combination consists of calculating a final score as weighted sum of the scores obtained for each implemented heuristic, and the maximum final score, or minimum final score, is selected as the best.

Alternatively, the selected display zone is the zone having obtained the highest number of best scores according to the various heuristics used, i.e., the final score of a zone is therefore the number of best scores obtained by this zone according to the various heuristics used, and the maximum final score is selected as being the best.

According to one embodiment, only one or only a portion of the heuristics described above is implemented to determine the main display zone.

Alternatively, other methods for determining a main display zone are implemented, combining the heuristics described above and content analysis methods making it possible for example to detect advertising videos and consequently to eliminate the determined display zone associated with such a video.

For example, it is possible to select the two or three display zones having obtained the best final scores and next to analyze the content thereof over a certain time period going from a single image sample to several tens of images to discriminate the best zone.

According to one sub-optimal embodiment, the values of the pixels displayed in all of the determined display zones are first recorded, then an analysis of the contents is done to determine the main video stream. This embodiment is sub-optimal because it requires more memory and computing resources to determine and extract a main video stream from the downloaded multimedia stream(s).

The proposed content analysis techniques can include the detection of a black screen or an invariant element in the image such as a logo identifying a TV channel, or for example a measurement of the frequency of shot changes, which, when close, characterize advertising content.

The invention claimed is:

1. A method for processing multimedia streams, in particular for verifying access rights to content of a multimedia stream, the multimedia stream being provided by a server device connected to a communication network, and downloadable by a client device via data formatted in a markup language, by using software for browsing and displaying data formatted in a markup language, cooperating with software for reading multimedia streams, the multimedia stream comprising at least two video streams comprising a main video stream and at least one additional video stream, each video stream having an associated display zone of a display screen of the client device, the method comprising:
   determining, for each video stream extracted from the multimedia stream, the associated display zone, allocated by said browsing and display software to the software for reading multimedia streams;
   identifying a main display zone, among the determined display zones, as being the display zone associated with the main video stream, comprising:
      computing a score associated with each determined display zone; and
      selecting, as the main display zone, the display zone whose associated score is the highest score or the lowest score; and
   recording at least one digital image formed by values of pixels to be displayed in the display zone determined at a given time.

2. The method according to claim 1, wherein said determining implements an analysis of commands exchanged between the browsing and display software and the software for reading multimedia streams, based on a programming interface provided by the browsing and display software.

3. The method according to claim 2, further comprising intercepting a command to create or initialize an executable instance of the software for reading multimedia streams.

4. The method according to claim 2, further comprising determining a display mode from among a first mode and a second mode by analyzing a command to allocate a display zone sent by the browsing and display software and the software for reading multimedia streams.

5. The method according to claim 1, wherein said computing a score depends on at least one operation from among a group consisting of: calculating a surface area occupied by each display zone, calculating a number of display zones at least partially superimposed on each display zone, and calculating a ratio between at least a first and second dimension of each display zone.

6. The method according to claim 1, wherein the recorded pixel values form a digital image, the method further comprising analyzing recorded digital images to determine the digital images belonging to the main video stream and the digital images belonging to an additional video stream.

7. A device for processing multimedia streams, in particular for verifying access rights to a content of a multimedia stream, the processing device comprising:
- a central processing unit; and
- a data storage unit, the processing device comprising or being connected to a display screen, the multimedia stream being provided by a server device connected to a communication network, and downloadable by the processing device via data formatted in a markup language, while using software for browsing and displaying data formatted in a markup language, cooperating with software for reading multimedia streams, the multimedia stream comprising at least two video streams comprising a main video stream and at least one additional video stream, each video stream having an associated display zone of said display screen; and
- a module operable for:
    - determining, for each video stream extracted from the multimedia stream, the associated display zone, allocated by the browsing and display software to the software for reading multimedia streams;
    - identifying a main display zone, among the determined display zones, as being the display zone associated with the main video stream, comprising:
        - computing a score associated with each determined display zone; and
        - selecting, as the main display zone, the display zone whose associated score is the highest score or the lowest score; and
    - recording at least one digital image formed by values of pixels to be displayed in the display zone determined at a given time.

8. A non-transitory computer readable medium storing instructions, which, when executed by a processor of an electronic device, cause the processor to implement a method for processing a multimedia stream according to claim 1.

9. The method according to claim 1, wherein said recording is performed at a predetermined temporal frequency, making it to possible to record a plurality of digital images of the video stream.

10. The method according to claim 4, wherein, when the display mode is a first display mode, the method further comprises intercepting a command to update a display zone, and wherein said recording is performed after said interception.

* * * * *